US012793356B2

(12) United States Patent
Sayed et al.

(10) Patent No.: US 12,793,356 B2
(45) Date of Patent: Nov. 10, 2026

(54) MONOCULAR DEPTH ESTIMATION WITH GEOMETRY-INFORMED DEPTH HINT

(71) Applicant: Niantic Spatial, Inc., San Francisco, CA (US)

(72) Inventors: Mohamed Amr Abdelfattah Sayed, London (GB); Filippo Aleotti, London (GB); James Watson, London (GB); Zawar Imam Qureshi, London (GB); Sara Alexandra Gomes Vicente, London (GB); Michael David Firman, London (GB); Guillermo Garcia-Hernando, London (GB); Gabriel J. Brostow, London (GB)

(73) Assignee: Niantic Spatial, Inc., San Francisco, CA (US)

( * ) Notice: Subject to any disclaimer, the term of this patent is extended or adjusted under 35 U.S.C. 154(b) by 63 days.

(21) Appl. No.: 18/677,651

(22) Filed: May 29, 2024

(65) Prior Publication Data

US 2025/0371761 A1 Dec. 4, 2025

(51) Int. Cl.
*G06T 19/00* (2011.01)
*G06T 7/00* (2017.01)
(Continued)

(52) U.S. Cl.
CPC .............. *G06T 19/006* (2013.01); *G06T 7/55* (2017.01); *G06T 7/70* (2017.01); *G06T 11/65* (2026.01);
(Continued)

(58) Field of Classification Search
None
See application file for complete search history.

(56) References Cited

U.S. PATENT DOCUMENTS

2019/0295282 A1* 9/2019 Smolyanskiy ....... G06N 3/0495
2019/0356905 A1* 11/2019 Godard ..................... G06T 7/73
(Continued)

OTHER PUBLICATIONS

Sayed et al. "SimpleRecon: 3D Reconstruction Without 3D Convolutions". (Year: 2022).*
(Continued)

*Primary Examiner* — Zhihan Zhou
(74) *Attorney, Agent, or Firm* — Fenwick & West LLP

(57) ABSTRACT

A depth estimation model leverages a geometry-rendered depth map from a low-cost geometry model to provide depth hints. The model is trained and configured to input a time series of frames including a target frame. The time series of images are captured as monocular video data by a camera assembly. Applying the model includes: applying a feature encoder to extract visual features forming a feature map for each frame, matching features across the features maps forming a cost volume, obtaining a geometry-rendered depth map from the low-cost geometry model of the scene based on a pose of the target frame, modifying the cost volume based on the geometry-rendered depth map, and applying a depth decoder to the modified cost volume to generate the depth map for the target frame. A client device implementing the model may generate virtual content using the depth map to display the target frame of the scene augmented with the virtual content.

20 Claims, 8 Drawing Sheets

(51) Int. Cl.
*G06T 7/55* (2017.01)
*G06T 7/70* (2017.01)
*G06T 11/65* (2026.01)
*G06T 15/08* (2011.01)

(52) U.S. Cl.
CPC .... *G06T 15/08* (2013.01); *G06T 2207/20084* (2013.01)

(56) References Cited

U.S. PATENT DOCUMENTS

| | | | | |
|---|---|---|---|---|
| 2020/0160546 | A1* | 5/2020 | Gu | G06T 3/18 |
| 2020/0351489 | A1* | 11/2020 | Watson | G06N 20/00 |
| 2022/0063605 | A1* | 3/2022 | Ji | G06F 18/2193 |
| 2022/0189049 | A1* | 6/2022 | Watson | G01B 11/22 |
| 2022/0383530 | A1* | 12/2022 | Giryes | G06N 3/0464 |
| 2023/0360241 | A1* | 11/2023 | Sayed | G06T 17/00 |
| 2024/0005541 | A1* | 1/2024 | Gong | G06N 3/0464 |

OTHER PUBLICATIONS

Choe et al. "VolumeFusion: Deep Depth Fusion for 3D Scene Reconstruction". (Year: 2021).*

* cited by examiner

MONOCULAR DEPTH ESTIMATION WITH GEOMETRY-INFORMED DEPTH HINT

BACKGROUND

1. Technical Field

The subject matter described generally relates to estimating a depth map for an input image, and in particular to a machine-learned model for estimating the depth map based on geometry-informed depth hints.

2. Problem

Depth estimation has many applications. For example, depth sensing aid in navigation, scene understanding, and augmented reality. Particularly in the context of augmented reality, quick and accurate per-frame depth estimation is foundational to providing real-time interactive content. Traditional models focus on bolstering accuracy of the depth estimates, but at the sacrifice of computation cost and estimation speed. This results in high latency augmented reality content that breaks the perception of augmented reality.

SUMMARY

A depth estimation model leverages geometry-informed depth hints from a low-cost geometry model to improve depth estimation particularly for applications in augmented reality (AR). This depth estimation model maintains highly accurate per-frame depth estimation while not sacrificing on computational speed, which is critical for real-time interactive content in AR. The geometry model may be iteratively refined as the depth estimation model further outputs depth maps, e.g., via volumetric scene reconstruction.

The model is trained and configured to input a time series of frames including a target frame. The time series of images are captured as monocular video data by a camera assembly. Applying the model includes: applying a feature encoder to extract visual features forming a feature map for each frame, matching features across the features maps forming a cost volume, obtaining a geometry-rendered depth map from the low-cost geometry model of the scene based on a pose of the target frame, modifying the cost volume based on the geometry-rendered depth map, and applying a depth decoder to the modified cost volume to generate the depth map for the target frame. A client device implementing the model may generate virtual content using the depth map to display the target frame of the scene augmented with the virtual content.

DETAILED DESCRIPTION

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. Wherever practicable similar or like reference numbers are used in the figures to indicate similar or like functionality. Where elements share a common numeral followed by a different letter, the elements are similar or identical. The numeral alone refers to any one or any combination of such elements.

Example Parallel-Reality Game System Using Depth Model

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining depth information from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
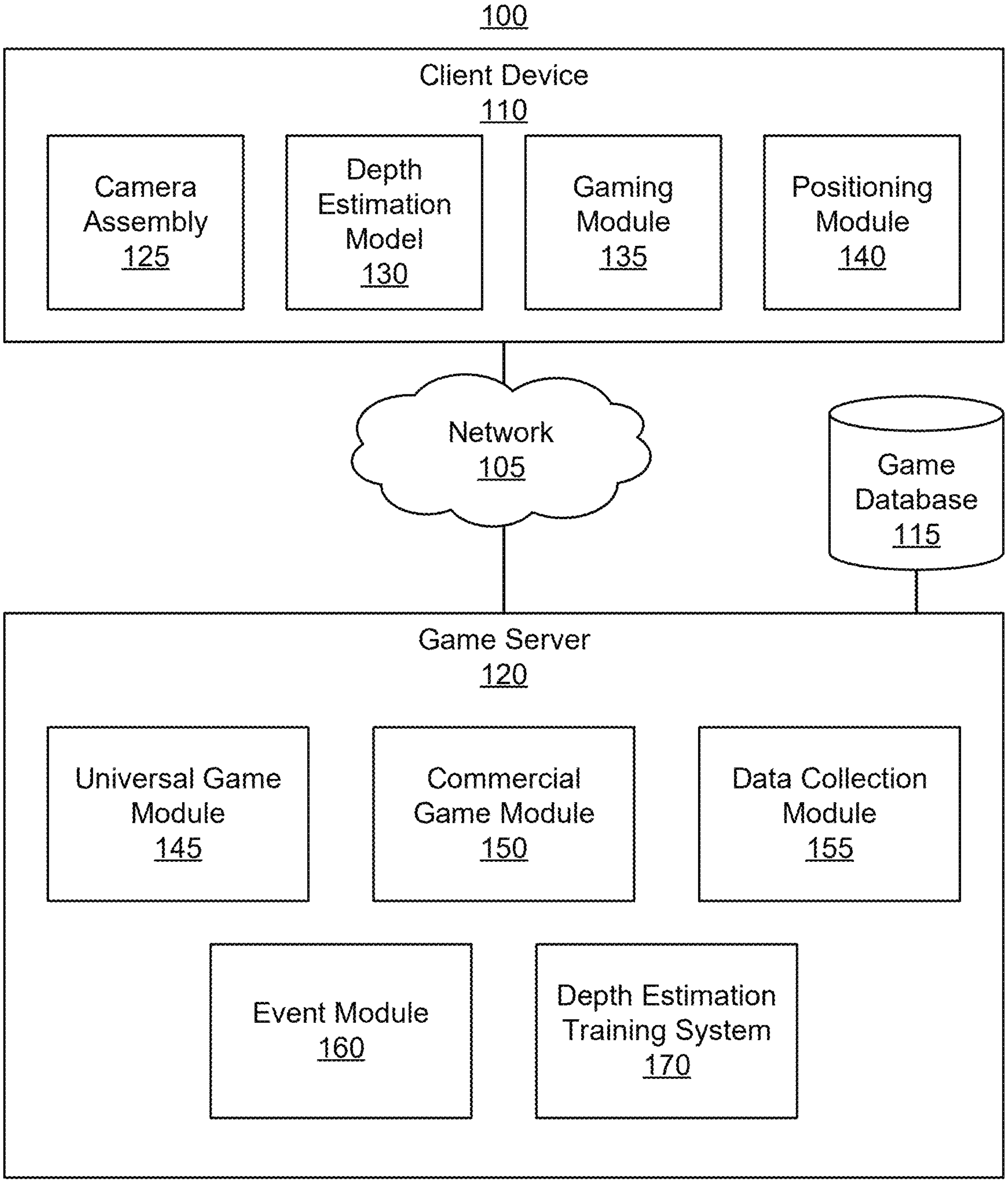
FIG. 1 illustrates a networked computing environment, in accordance with one or more embodiments.

FIG. 1 illustrates one embodiment of a networked computing environment 100. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

In the embodiment shown in FIG. 1, the networked computing environment 100 uses a client-server architecture, with a game server 120 that communicates with a client device 110 over a network 105 to provide a parallel reality game to a player at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that may be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 is a conventional computer system, such as a desktop or a laptop computer. Still yet, the client device 110 may be a computing device implemented on a vehicle. As a computing device, the client device 110 can include one or more processors and one or more computer-readable storage media. The computer-readable storage media can store instructions which cause the processor to perform operations. In one or more embodiments, the client device 110 is a portable computing device that can be easily carried or otherwise transported with a player, such as a smartphone or tablet.

The client device 110 communicates with the game server 120 providing the game server 120 with data from the client device 110. For example, the client device 110 may provide sensory data of a physical environment around the client device 110. The client device 110 may also provide user input to the game server 120 relating to performable actions in relation to the parallel-reality game.

In one or more embodiments, the client device 110 includes a camera assembly 125, a depth estimation model 130, a gaming module 135, and a positioning module 140. The client device 110 may include various other software modules or input/output devices for receiving information from or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment around the client device 110. The camera assembly 125 may utilize a variety photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In various other implementations, the camera assembly 125 comprises a plurality of cameras each configured to capture image data, e.g., stereoscopic image data.

The depth estimation model 130 outputs estimated depth maps based on input images of a real-world scene. The depth estimation model 130 may also receive one or more additional images of the scene that have a close temporal relationship to the input image (e.g., the frames of a monocular video from which the input image is taken that immediately precede the input image). The depth estimation model 130 outputs a depth map of the scene based on the input image. In embodiments where the additional temporal images are available, the depth estimation model 130 may output the depth map further based on the additional images. The depth estimation model 130 may also output a depth map for each of the images. The depth estimation model 130 may be trained by a depth estimation training system 170 and can be updated or adjusted by the depth estimation training system 170, which is discussed in greater detail below.

The received input image may be captured by a camera of the camera assembly 125 or another camera from another client device 110. In some embodiments, some or all of the received input image and additional images have appended metadata specifying intrinsics of the camera. The intrinsics may include one or more geometric properties of the camera at a time when the image was captured, e.g., the focal length of the camera when capturing the image, the camera's principal point offset, the skew of the camera, etc. With the intrinsics, the depth estimation model 130 may generate an intrinsic matrix accounting for the intrinsics. In some embodiments, the depth estimation model 130 determines whether images are satisfactory, e.g., above a threshold resolution. If not, the depth estimation model 130 may perform one or more pre-processing techniques to ensure the images are satisfactory, e.g., upsample the images in question to a desired resolution prior to determining the depth map of the scene. Other example conditions include adjusting an exposure, a contrast, a grain, a color scale, or other characteristic of the image, etc.

The depth estimation model 130 is implemented with one or more machine learning algorithms. Machine learning algorithms that may be used for the depth estimation model 130 include neural networks, decision trees, random forest, regressors, clustering, other derivative algorithms thereof, or some combination thereof. In one or more embodiments, the depth estimation model 130 is structured as a neural network comprising a plurality of layers including at least an input layer configured to receive the input image (and additional images where available) and an output layer configured to output the depth prediction. Each layer comprises a multitude of nodes, each node defined by a weighted combination of one or more nodes in a prior layer. The weights defining nodes subsequent to the input layer are determined during training by the depth estimation training system 170. Architecture of the depth estimation model is further described in conjunction with FIGS. 4 & 5.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content or adjust virtual content according to other information received from other components of the client device 110. For example, the gaming module 135 may adjust a virtual object to be displayed on the user interface according to a depth map (e.g., determined by the depth estimation model 130) of the scene captured in the image data.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate or adjust game content to be displayed by the client device 110. For example, the gaming module 135 may generate a virtual element based on depth information (e.g., as determined by the depth estimation model 130).

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g.

player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal gaming module 145, a commercial game module 150, a data collection module 155, an event module 160, and a depth estimation training system 170. As mentioned above, the game server 120 interacts with a game database 115 that may be part of the game server 120 or accessed remotely (e.g., the game database 115 may be a distributed database accessed via the network 105). In other embodiments, the game server 120 contains different or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve or store game data when hosting the parallel reality game. The universal game module 145 also receives game data from client device 110 (e.g. depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The depth estimation training system 170 trains a depth estimation model, e.g., the depth estimation model 130 provided to the client device 110. The depth estimation training system 170 receives one or more sets of images for use in training the depth estimation model (e.g., training data). In one or more embodiments, each set may include a time-series of images. In one embodiment, the time-series of images is frames from a monocular video, i.e., video captured by a single camera. In estimating the depth map for a particular image, the depth estimation training system 170 may leverage images from both before and after the particular image in the time-series. In contrast, when the model is deployed on real-time captured image data, the depth estimation model 130 leverages images up to a current timestamp when estimating the depth map to enable real-time applications.

Generally, for a given set of images, the depth estimation training system 170 performs any desired preprocessing, inputs the set into the depth estimation model to generate a depth prediction. The depth estimation training system 170 may calculate a loss between the depth predictions and ground truth depth maps. With the losses, the depth estimation training system 170 iteratively adjusts parameters of the depth estimation model to minimize the loss. The general process above describes a supervised training algorithm.

The depth estimation training system 170 may perform iterative batch training, e.g., training the depth estimation model 130 batch-by-batch of training images. A number of epochs for training determines a number of instances of feeding the training image data through the depth estimation model 130 forward and backward. Upon conclusion of training, the depth estimation training system 170 may validate the depth estimation model 130 with a set of training image data with ground truth depth data to determine an accuracy of the trained depth estimation model 130.

In various embodiments, the cost volume is adaptive. In particular, the minimum and maximum distances (i.e., depths) that define the cost volume are parameters that are learned during training. Cost volumes benefit from allowing the depth estimation model to leverage inputs from multiple viewing angles (e.g., the additional images derived from the monocular video). The minimum and maximum depths are typically hyperparameters that may be set assuming a static real-world environment. In some embodiments the minimum and maximum depths are tuned during the training.

In other various embodiments, pixels unreliable for depth prediction are filtered out from the additional images. In these embodiments, a secondary depth network is used to aid training. The secondary network takes single images rather than a time-series of images as input and outputs estimated depth maps. The secondary depth network may share a pose network with the depth estimation model being trained to provide consistency. In other embodiments, the relative pose may be determined using a different pose determination methodology, e.g., using a simultaneous localization and mapping (SLAM) algorithm (visual or IMU-based), other pose determination algorithms based on accelerometer data, visual odometry, etc. The secondary depth network is used to identify pixels for which the depth values generated by the model being trained are unreliable. For example, moving objects often result in inaccurate depth values from the model being trained because it takes a time-series of images as input, which can result in the model overfitting to artifacts caused by the motion rather than learning to accurately predict the depth of pixels. Similarly, objects with little texture can also produce inaccurate depth values. Pixels for which the model being trained and the secondary depth network generate results that differ by more than a threshold may be flagged as unreliable. For example, the depth estimation training system 170 may generate a binary mask indicating reliable and unreliable pixels, and include a term in the loss function for the unreliable pixels that encourages the model being trained to more closely align with the values generated by the secondary depth network.

In some embodiments, the depth estimation training system 170 accounts for scenarios where there is little to no change between images in a time-series (e.g., video captured by a static camera). The depth estimation training system 170 simulates a static camera by randomly (e.g., with a specified probability) color augmenting a single image to determine the cost volume with the color augmented version. Similarly, to account for deployment situations where only a single input image is provided, randomly selected iterations of the training process may replace the cost volume with all zeroes (or some other constant value), thereby generating a blank cost volume. Thus, in deployment situations where only a single input image is available, a blank cost volume may be input into the model, which has been trained to still produce reasonable depth maps in the absence of the additional images that could be used to generate a cost volume.

The depth estimation training system 170 after training its models with the training images can provide parameters for the depth estimation model 130 to receive a time sequence of input images and generate a depth map for one or more of the images using the parameters learned by the depth estimation training system 170. Note that, although the depth estimation training system 170 is shown as part of the game server 120 for convenience, some or all of the models may be trained by other computing devices and provided to client devices 110 in various ways, including being part of the operating system, included in a gaming application, or accessed in the cloud on demand.

Once the depth estimation model is trained, the depth estimation model receives image data and outputs depth information of the environment based on the image data. The depth estimation training system 170 provides the trained model to the client device 110. The client device 110 uses the trained model to estimate the depth of pixels in images (e.g., captured by a camera on the device). The depth estimates may have various uses, such as aiding in the rendering of virtual content to augment real world imagery, assisting navigation of robots, detecting potential hazards for autonomous vehicles, and the like.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Parallel-Reality Game

Figure 2:
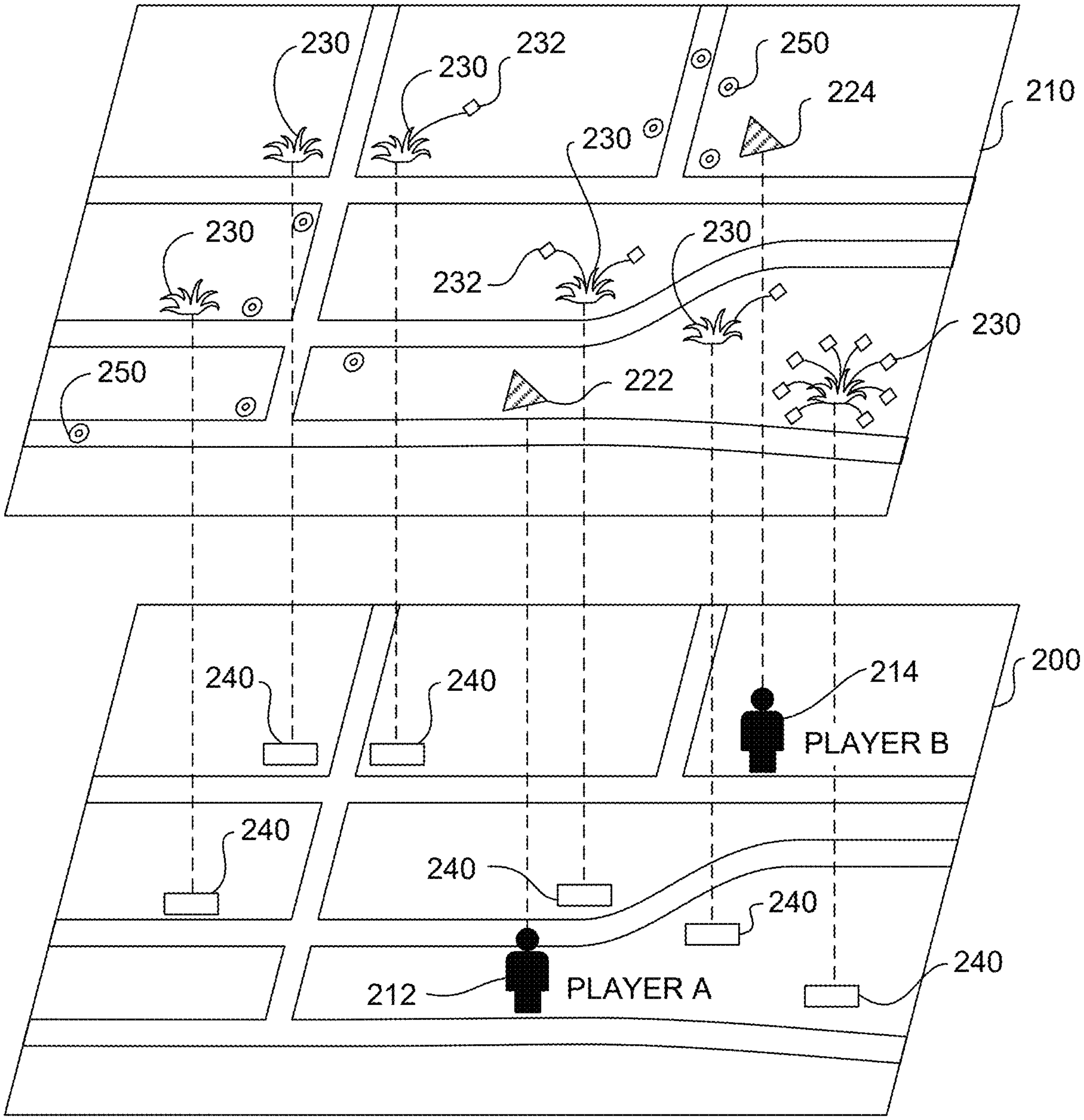
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Figure 3:
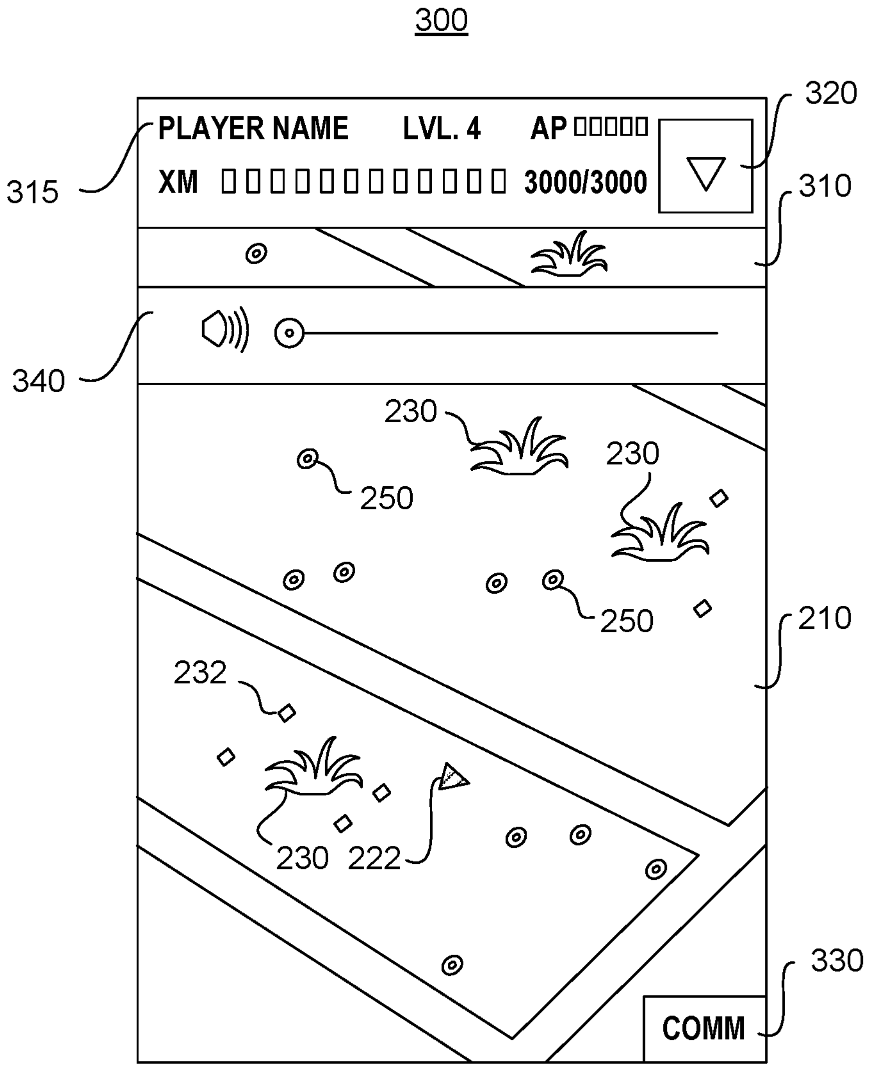
FIG. 3 depicts an exemplary game interface of a parallel reality game, in accordance with one or more embodiments.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Depth Estimation Model With Geometry-Informed Depth Hints

Figure 4:
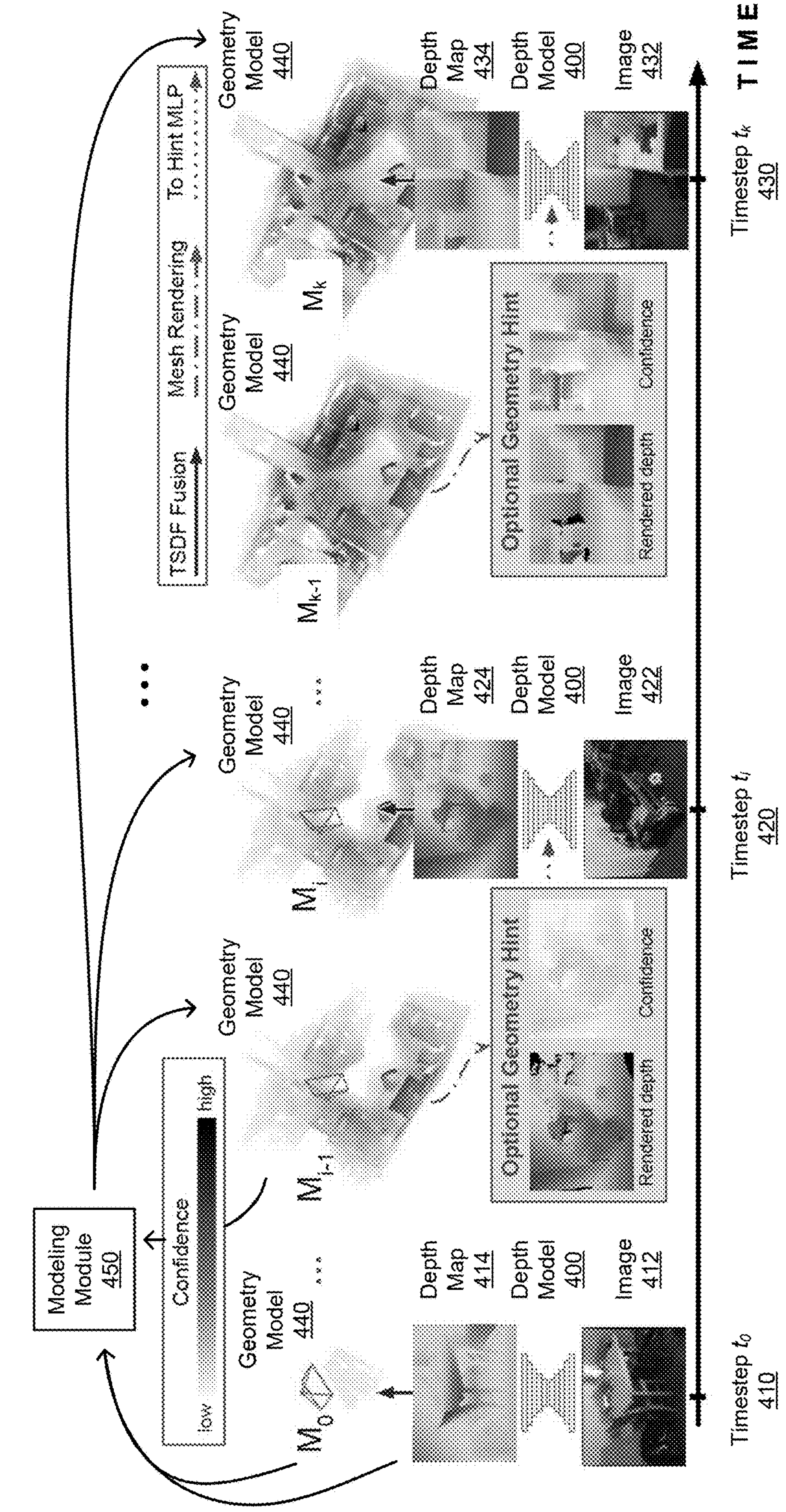
FIG. 4 illustrates real-time depth estimation leveraging geometry-informed depth hints from a low-cost geometry model, in accordance with one or more embodiments.

FIG. 4 illustrates depth estimation leveraging geometry-informed depth hints from a low-cost geometry model, in accordance with one or more embodiments. In general, the depth estimation model 400 inputs at least one image and outputs a depth map corresponding to that image. In other embodiments, the depth estimation model 400 inputs a timeseries of images and outputs a timeseries of depth maps corresponding to each image in the timeseries. With a low-cost geometry model 440, i.e., low computation cost, the depth estimation model 400 may feed in depth hints from the geometry model 440 in estimating the depth map. A modeling module 450 builds and updates the geometry model 440 with the output depth maps. In one or more embodiments, the modeling module 450 implements a truncated signed distance function (TSDF) to build up the geometry model 440 with the output depth maps and the poses for the depth maps.

In one or more embodiments, the depth estimation model 400 is applied for real-time depth estimation of image data. In some embodiments, the geometry model 440 is built from the ground up by the modeling module 450. At an initial timestep $t_0$ 410, a first image 412 is captured (e.g., by a camera assembly of a client device) and input into the depth estimation model 400 to output an estimated depth map 414. The modeling module 450 generates the geometry model 440 with the depth map 414. At this timestep, as there was no former geometry model, there are no geometry-informed depth hints in the estimating the initial depth map 414. At a subsequent timestep $t_i$ 420, the modeling module 450 has formed a substantial geometry model 440 (represented as $M_{i-1}$). The depth estimation model 400 inputs the image 422 captured at the timestep $t_i$ 420, geometry-informed depth hints, and an associated confidence matrix. The depth hints and the associated confidence matrix are extracted from the geometry model 440 based on a pose of the image 422. The pose informs what perspective to capture depth information from the geometry model 440. The geometry model is iteratively updated by the modeling module 450 as more depth maps are captured. The modeling module 450 updates the geometry model 440 (e.g., from output $M_{i-1}$ to $M_i$) with the output depth map 424 for the timestep $t_i$ 420. Each update with an output depth map refines the geometry model 440, either by expanding the geometry model 440 to cover unmodeled regions of the environment, or by improving the accuracy and/or the confidence of modeled regions. The geometry model 440 may reflect the confidence at each position of the geometry model 440.

In other embodiments, the depth estimation model 400 may cache geometry models created for different environments. In such embodiments, when a client device leveraging the depth estimation model 400 returns to a previously visited environment, i.e., one that has a cached geometry model, then the client device can retrieve the cached geometry model. In such embodiments, a client device implementing the depth estimation model 400 may track a location of the client device (e.g., may be represented as global positioning coordinates, etc.). Based on the tracked location, the client device may access a cache of geometry models to retrieve a cached geometry model associated with the location. In some embodiments, the cache may be stored locally on the client device, e.g., geometry models built by the modeling module in past depth estimation sessions. In other embodiments, the cache may be stored on a cloud-based computing system (e.g., the game server 120). For example, geometry models may be built and refined through crowd-sourcing other client devices. In such embodiments, updates to the geometry model may be pushed back up to the cloud-based computing system to refine the geometry models cached by the cloud-based computing system. In yet other embodiments, the client device may store a local cache while the cloud-based computing system may store a cloud-based cache. Updates to geometry models by client devices may be pushed up the cloud-based computing system, where the cloud-based computing system may collate updates from various client devices to refine the cloud-based cache of geometry models.

In other embodiments, the depth estimation model 400 performs depth estimation with the geometry-informed depth hints in an offline manner. In such embodiments, the modeling module 450 may move forwards and/or backwards in time to build up the geometry model 440. The depth estimation model 400 may also move forwards and backwards in time to re-estimate depth maps for earlier timestamps with geometry-informed depth hints from the comprehensively built geometry model 440.

Figure 5:
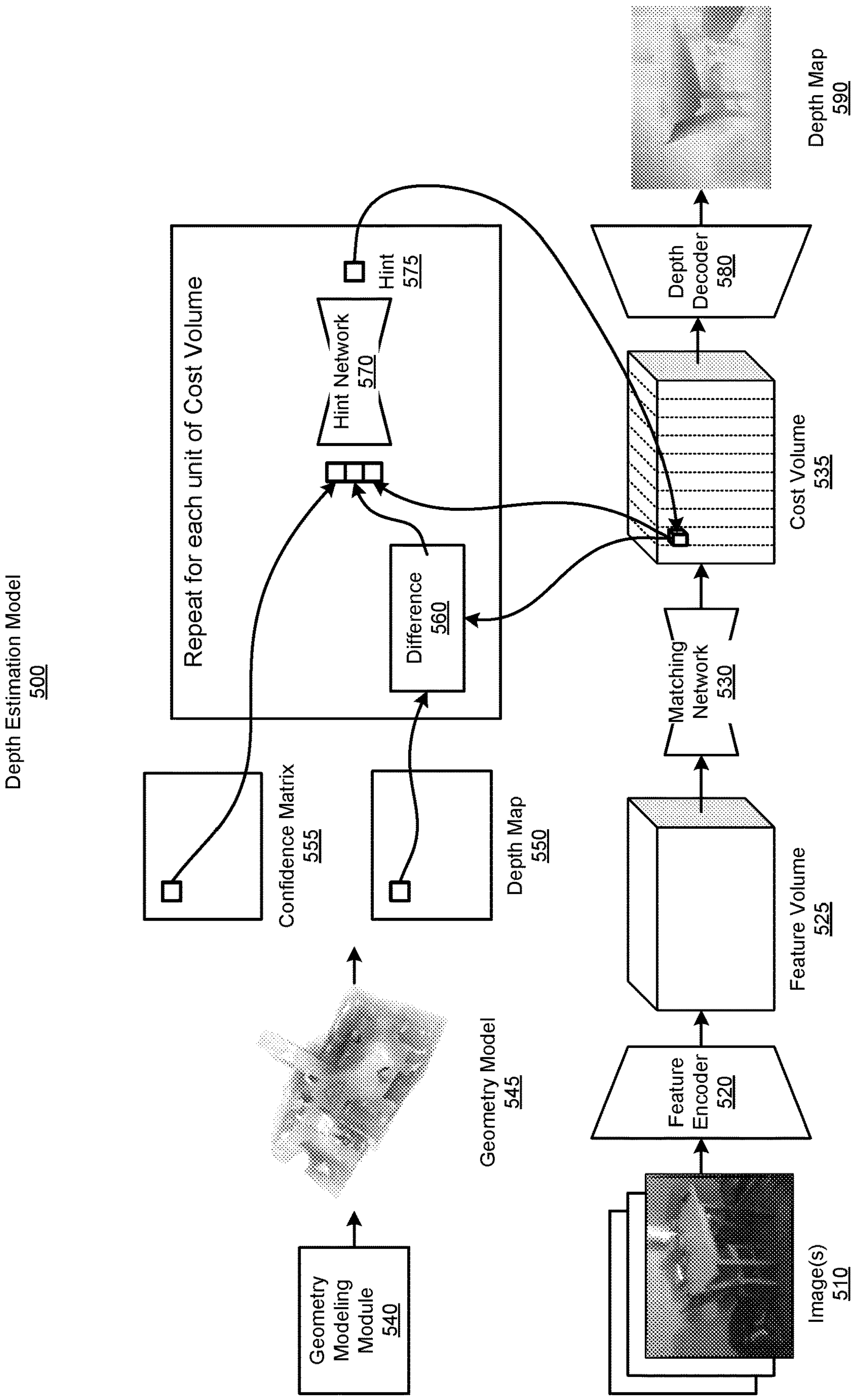
FIG. 5 illustrates the architecture of a depth estimation model, in accordance with one or more embodiments.

FIG. 5 illustrates an architecture of a depth estimation model 500, in accordance with one or more embodiments. In the embodiment shown, the depth estimation model 500 is configured for multi-frame input. The frames include prior frames from a plurality of prior timesteps and a current frame from a current timestep. The depth estimation model 500 leverages geometry-informed depth hints to estimate a depth map for the current frame. In other embodiments, the depth estimation model 500 may be configured for single-frame input. In other embodiments, the depth estimation model 500 may be configured for stereoscopic input.

In one or more embodiments, the depth estimation model includes a feature encoder 520, a matching network 530, a hint network 570, and a depth decoder 580. Each of these components may be structured as a machine-learning neural network (e.g., multi-layer perceptrons), or some other machine-learning model.

The depth estimation model 500 receives input image(s) 510 (e.g., from a monocular video). The feature encoder 520 of the depth estimation model 500 extracts features from an input image 510, i.e., in the form of a feature map. The feature maps may have dimension C×H×W, where C is the channel dimension (i.e., number of feature channels), and H×W is the dimensionality of the feature maps. The feature encoder 520 may implement one or more computational algorithms to extract features from the input images. Example algorithms for feature extraction may include a convolutional kernel, edge detection algorithms, object detection algorithms, etc. In some embodiments, the feature volume is a data matrix collating features map(s) corresponding to the input image(s) 510. There may be one feature map corresponding to each input image. The feature map may have smaller dimensionality than the input image. The feature maps of the input image(s) are warped to different depth planes and aggregated across the features maps, yielding the feature volume 525, which may have dimensionality of M×D×H×W, where M is the aggregate channel dimension (e.g., M≥C), D is the number of depth planes, and H×W is the dimensionality of the feature maps.

The matching network 530 of the depth estimation model 500 builds a cost volume 535 based on the feature volume 525. In one or more embodiments, the matching network 530 matches features across features channels in the feature volume 525. The matching network 530 is a learned manner of computing distance of features across multiple input image(s) in the feature volume. In one or more embodiments, the matching network 530 reduces the feature dimension into a single value, thereby yielding the cost volume 535 of D×H×W dimensionality. In one or more embodiments, the matching network 530 may be applied in parallel at each spatial location and at each depth plane in the feature volume.

In one or more embodiments, the cost volume 535 is a data matrix that collates distances between feature maps warped to different depth planes. An ordered set of depth planes P perpendicular to the optical axis of the input image may be determined with hypothesized depths spaced between $d_{min}$ and $d_{max}$. The spacing of the hypothesized depths may be linear or non-linear (e.g., exponential spacing) which can allow for variable granularity of the cost volume at different depths (e.g., closer depths have fine-grained granularity through close spacing and farther depths have large-grained granularity through spread out spacing). In other embodiments, the number of depths and/or planes can be optimized to trade-off computational cost and accuracy of the depth estimation model 500 (e.g., the more depths and/or planes, the higher the computational cost and higher accuracy). The optimization could be accomplished through cross-validation or through Neural Architecture Search. The distances may be collated from warping feature maps in the feature volume 525 to the various depth planes in the cost volume 535. The distance may be an absolute difference, $l_2$ distance, Manhattan distance, Minkowski distance, Hamming distance, another distance metric, etc. The cost volume 535 may be further averaged across all input image(s) 510. In one or more embodiments, the cost volume 535 may be of dimensionality D×H×W. This dimensionality permits 2D convolutions over the more computationally-expensive 3D convolutions.

The hint network 570 modifies the cost volume 535 based on geometry-rendered depth map 550 and an associated confidence matrix 555. The hint network 570 obtains the geometry-rendered depth map 550 and the associated confidence matrix 555 from a geometry model 545 generated by a geometry modeling module 540. The geometry model 545 may be generated in a low-computation-cost manner. In one or more embodiments, the geometry modeling module 540 generates the geometry model 545 through a truncated signed distance function that performs volumetric scene reconstruction. The truncated signed distance function projects depth maps with known pose to reconstruct a coarse three-dimensional representation of the environment (e.g., a geometry model). Other volumetric or non-volumetric scene reconstruction algorithms can be implemented, e.g., algorithms that build geometry models from purely posed image data such as Gaussian splatting, point clouds, meshes, etc.

The hint network 570 may input the matching score from the cost volume 535, a depth hint as a difference between a corresponding value of the geometry-rendered depth map 550 and the depth of the depth plane from the cost volume 535, and a confidence value from the confidence matrix 555 associated with the depth value of the geometry-rendered depth map 550, to output a hint-modified value that replaces the matching score in the cost volume 535. The hint network 570 may be applied in parallel at each spatial location and depth plane in the cost volume 535. For pixels in the cost volume 535 where there is no depth hint (i.e., no depth information for that pixel from the geometry model 545), the confidence value may be set to 0 and the depth hint to −1.

The depth decoder 580 of the depth estimation model 500 inputs the modified cost volume 535 to generate a depth map 590 for a current frame of the input image(s) 510. During deployment, preceding frame(s) relative to the current frame, i.e., taken at an earlier timestep, can be input to provide multi-frame depth estimation.

The geometry modeling module 540 builds and updates the geometry model 545 with the output depth map 590. With time series frames from video data, the depth estimation model 500 may iteratively estimate a depth map for each newly captured frame. The geometry modeling module 540 performs the volumetric scene reconstruction with the output depth maps for the frames to build the geometry model 545. As more and more depth maps are leveraged, the geometry model 545 may be iteratively refined, thereby increasing confidence in the geometry model 545.

Example Methods

Figure 6:
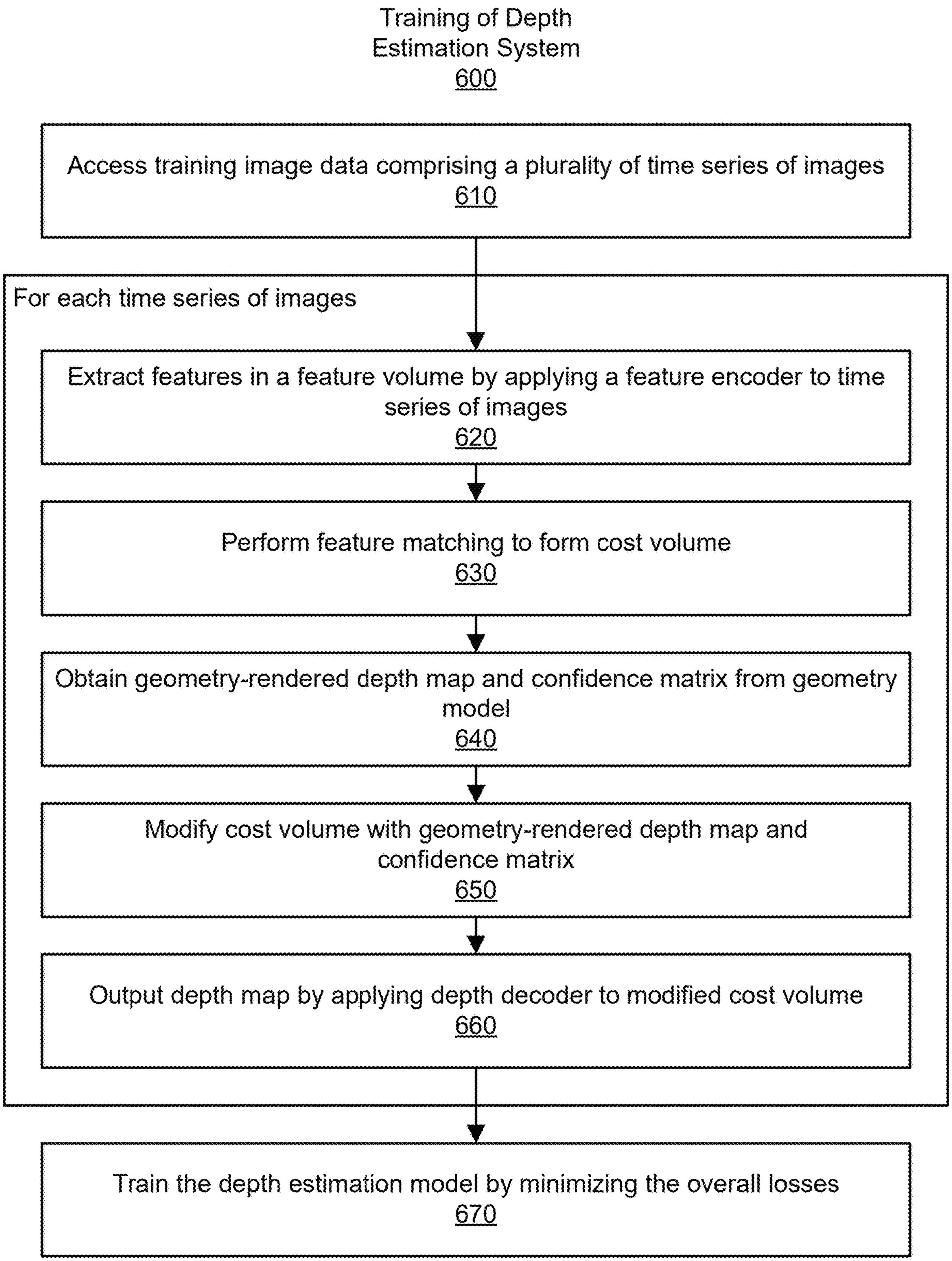
FIG. 6 is a method flowchart describing training of a depth estimation model with geometry-informed depth hints, in accordance with one or more embodiments.

FIG. 6 is a method flowchart describing training of a depth estimation model with geometry-informed depth hints, in accordance with one or more embodiments. The steps of FIG. 6 are illustrated from the perspective of the depth estimation training system 170 performing the method 600. However, some or all of the steps may be performed by other entities and/or components. In addition, some embodiments may perform the steps in parallel, perform the steps in different orders, or perform different steps.

In the embodiment shown, the depth estimation training system 170 accesses 610 training image data comprising a plurality of time series of images, such as monocular videos. The depth estimation training system 170 performs operations 620-660 (i.e., applying the depth estimation model) to each time series of images. An "image" can also be referred to as a "frame." In one or more embodiments, the depth estimation training system 170 may generate partial and/or complete mesh geometries (or other 3D spatial modeling approaches) using the training images to supplement construction of the geometry model.

In processing a given time series of images, the depth estimation training system 170 extracts 620 features to form a feature volume by applying a feature encoder to the time series of images. The feature encoder may be a machine-learning neural network. The feature encoder may be separately applied to each image to generate a feature map, which may be of smaller dimensionality than the input image. The feature maps may be warped to a target frame and aggregated to generate the feature volume.

The depth estimation training system 170 performs 630 feature matching (e.g., across the feature volume) to form a cost volume for the time series. The cost volume may be generated by applying a matching network, e.g., a machine-learning neural network, or some other distance calculation to reduce an aggregate feature channel into a single value.

The depth estimation training system 170 obtains 640 a geometry-rendered depth map and associated confidence matrix from a geometry model. The geometry model may be generated through volumetric scene reconstruction from historical depth maps of the scene from differing poses. The confidence matrix includes confidence values for each depth value in the geometry-rendered depth map.

The depth estimation training system 170 modifies 650 the cost volume with the geometry-rendered depth map and the confidence matrix. In some embodiments, a hint network, e.g., a machine-learning neural network, is applied to modify the cost volume on a per-pixel basis. The hint network may input, for a pixel of the cost volume, (1) a matching score at that pixel in the cost volume, (2) a difference between a depth value from the geometry-rendered depth map at that pixel and the depth of the depth plane from the cost volume, and (3) a confidence value associated with the depth value from the geometry-rendered depth map, to output a hint-modified value. The hint-modified value replaces the matching score in the cost volume.

The depth estimation training system 170 outputs 660 a depth map by applying a depth decoder to the modified cost volume.

The depth estimation training system 170 trains 670 the depth estimation model by minimizing the overall losses. The depth estimation training system 170 determines a loss for the training data. The loss may be a difference between the output depth map and a ground truth depth map. For a batch of depth maps, e.g., generated for a time series, the depth estimation training system 170 may determine an overall loss as an aggregation of the individual losses between an output depth map and a ground truth depth map for each frame. The depth estimation training system 170 adjust parameters of the depth estimation model, e.g., the feature encoder, the various networks, the depth decoder, etc., to minimize the overall losses. The depth estimation model components may be concurrently trained in an end-to-end training process, or independently.

Figure 7:
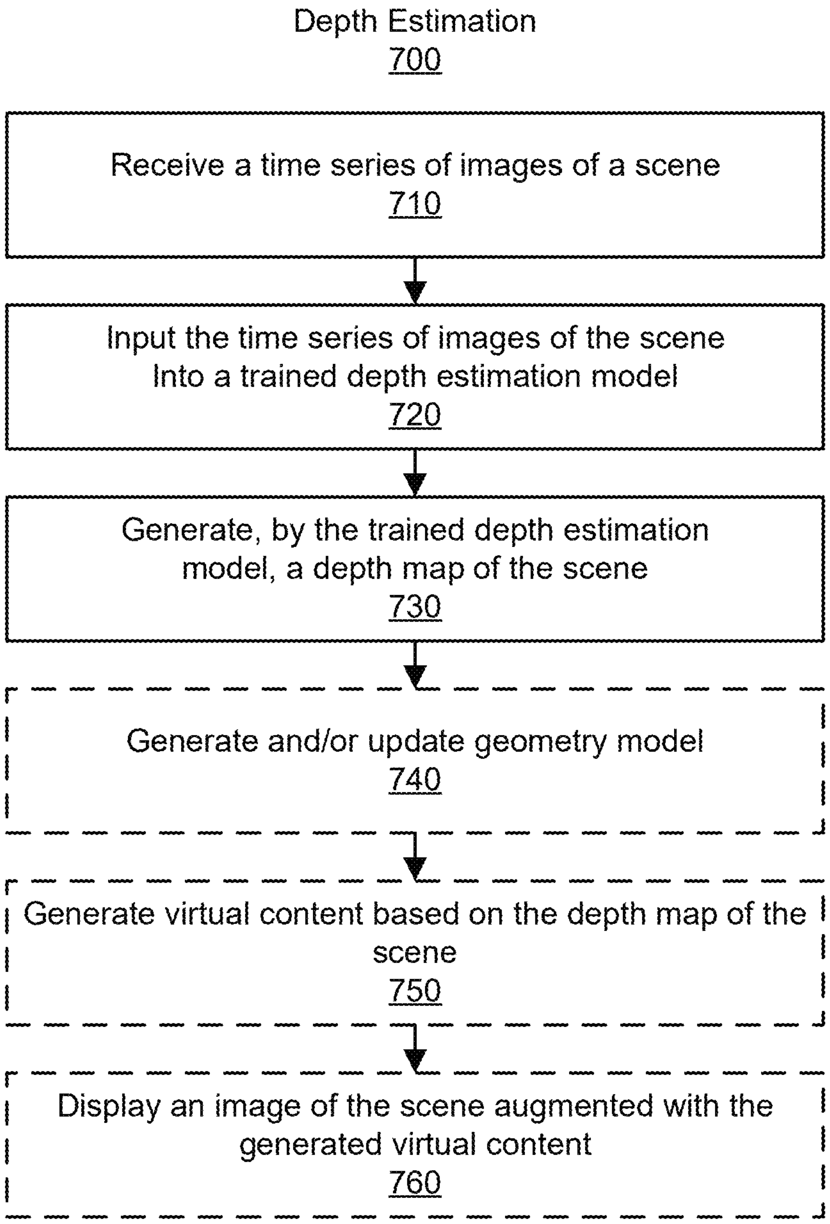
FIG. 7 is a method flowchart describing deployment of a depth estimation model trained using geometry-informed depth hints, according to one or more embodiments.

FIG. 7 is a method flowchart describing deployment of a depth estimation model trained using geometry-informed depth hints, according to one or more embodiments. The steps of FIG. 7 are illustrated from the perspective of the client device 110 performing the method 700. However, some or all of the steps may be performed by other entities and/or components. In addition, some embodiments may perform the steps in parallel, perform the steps in different orders, or perform different steps.

The client device 110 receives 710 a time series of images of a scene. The time series of images may be a video captured by a camera of the client device 110 or connected to the client device 110. In the context of the parallel reality game, the scene may be of a real-world location that maps to a virtual location in a virtual world.

The client device 110 inputs 720 the series of images of the scene into a trained depth estimation model. The depth estimation model may be trained by the depth estimation system 170, e.g., via the process 600 of FIG. 6. The depth estimation model receives the images of the scene and generates 730 a depth map of the scene corresponding to the image of the scene. As noted previously, the depth map may be generated for a current image and the time series of images may be a set of one or more previous images captured by the camera (e.g., one or more previous frames in a video). Each pixel of the depth map has a depth value describing a relative distance of a surface at the corresponding pixel in the image of the scene. The depth estimation receives the image of the scene and outputs the depth map based on the parameters trained for the depth estimation model.

The client device 110 may perform various additional operations with the generated depth map. For example, the client device 110 may be an autonomous vehicle capable of navigating in a real-world environment with the depth map. In another example, the client device 110 is part of an augmented reality system and can present real-world imagery augmented with virtual content. To accomplish this task, the client device 110 may utilize the generated depth map to generate the virtual content, resulting in virtual content interacting at correct depths with objects in the real-world imagery.

In one or more embodiments, the client device 110 generates and/or updates 740 the geometry model based on the output depth map. If there is no previously generated geometry model, the client device 110 may initialize the geometry model with the first output depth map. If there is a previously generated geometry model (e.g., generated by this client device 110 or by the game server 120), the client device 110 may update the geometry model with the output depth map.

In additional embodiments, the client device 110 generates 750 virtual content based on the depth map of the scene. The virtual content can be sourced from content for the parallel reality game, e.g., stored in the game database 115. The virtual content generated may be augmented reality content that can be augmented onto the image of the scene. For example, a virtual character is generated that can move about the scene with understanding of depth of the scene. In one instance, the virtual character can grow in size as the virtual character is walking on a street towards the user. In another instance, the virtual character can duck behind a tree where a portion of the virtual character is then occluded by the tree.

The client device 110 displays 760 the image of the scene augmented with the virtual content. The client device includes an electronic display. The electronic display can provide a constant feed of video captured by the camera with augmented virtual content.

Following the example above, the parallel reality game might provide interacting with the virtual character as an objective. In order to interact with the virtual character, a user of the mobile device may need to move their mobile device around while keeping the virtual character in a field of view of the camera. As the user moves the mobile device around, the mobile device can continually capture video or image data which can be used to iteratively generate depth information of the scene as the scene is changing with the user's movement of the mobile device. The mobile device can update the video feed on the display while also updating the virtual character based on generated depth information so that the user would perceive the virtual character as always interacting appropriately within the scene, e.g., not walking through objects, not having portions that are cut off without any object occluding those portions, etc.

Example Computing System

Figure 8:
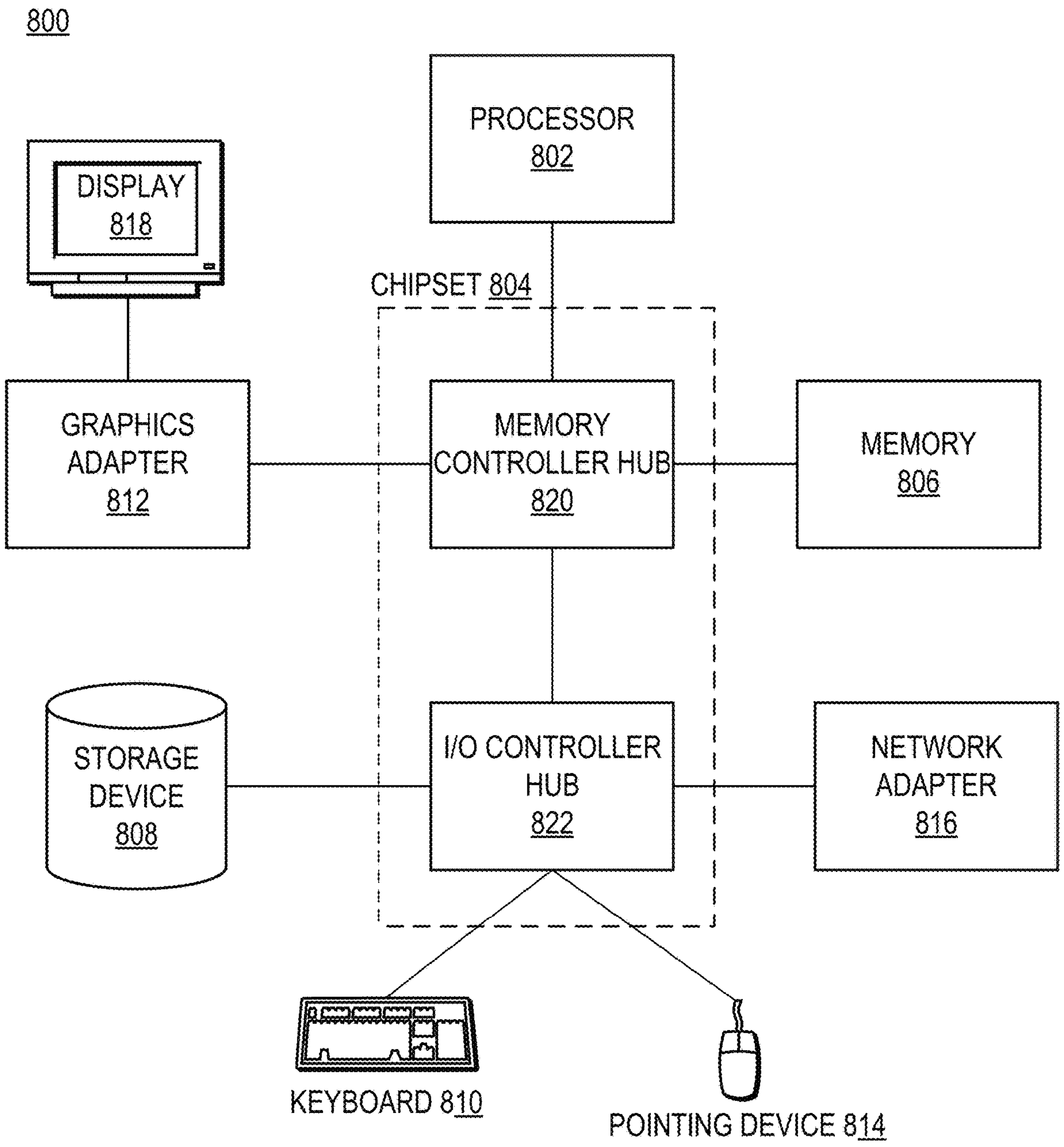
FIG. 8 illustrates an example computer system suitable for use in training or applying a depth estimation model, according to one or more embodiments.

FIG. 8 is an example architecture of a computing device, according to an embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random-access memory, such as DRAM, SRAM, DDR RAM, ROM, EEPROM, flash memory.

As is known in the art, a computer 800 can have different or other components than those shown in FIG. 8. In addition, the computer 800 can lack certain illustrated components. In one embodiment, a computer 800 acting as a server may lack a keyboard 810, pointing device 814, graphics adapter 812, or display 818. Moreover, the storage device 808 can be local or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 808, loaded into the memory 806, and executed by the processor 802.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:

receiving a time series of frames of a scene including a target frame, wherein the time series of frames is captured as monocular video data by a camera assembly;

applying a depth estimation model to the time series of frames including the target frame to output a depth map corresponding to the target frame, wherein applying the depth estimation model comprises:

generating a feature map for each frame in the time series of frames by applying a feature encoder of the depth estimation model to the frame to extract visual features forming the feature map, matching features across the feature maps of the time series of frames forming a cost volume, obtaining a geometry-rendered depth map from a geometry model of the scene based on a pose of the target frame in the scene, modifying the cost volume based on the geometry-rendered depth map, and generating the depth map for the target frame by applying a depth decoder of the depth estimation model to the modified cost volume; and generating virtual content using the depth map; and displaying the target frame of the scene augmented with the virtual content.

2. The computer-implemented method of claim 1, wherein matching the features across the feature maps comprises:

warping the feature maps from other frames in the time series of frames onto the feature map of the target frame at a plurality of hypothesis depth planes; and determining a distance between the warped feature maps and the feature map of the target frame, the distances at each of the plurality of hypothesis depth planes forming the cost volume.

3. The computer-implemented method of claim 2, wherein warping the feature maps from the other frames in the time series of frames is based on relative poses between the feature maps of the other frames and the feature map of the target frame.

4. The computer-implemented method of claim 3, wherein matching the features across the feature maps further comprises:

determining the relative poses by applying a convolutional neural network separately trained to determine the relative pose between two frames.

5. The computer-implemented method of claim 1, wherein matching features across the feature maps comprises applying a matching neural network to features across the feature maps to generate a matching score for a pixel of the cost volume.

6. The computer-implemented method of claim 1, further comprising:

generating the geometry model of the scene through volumetric scene construction from historical depth maps of the scene.

7. The computer-implemented method of claim 6, wherein generating the geometry model comprises applying a truncated signed distance function to integrate the historical depth maps from corresponding poses.

8. The computer-implemented method of claim 6, further comprising:

updating the geometry model of the scene with the depth map output by the depth estimation model for the target frame.

9. The computer-implemented method of claim 1, further comprising:

obtaining the geometry model from an online system, wherein the geometry model of the scene is generated through volumetric scene construction from historical depth maps of the scene captured from a plurality of client devices.

10. The computer-implemented method of claim 1, wherein applying the depth estimation model further comprises:

obtaining a confidence matrix associated with the geometry-rendered depth map, wherein modifying the cost volume is further based on the confidence matrix.

11. The computer-implemented method of claim 10, wherein modifying the cost volume comprises, per pixel of the cost volume:

determining a hint-modified value by applying a hint neural network to a matching score of the pixel, a difference between a depth of a depth plane of the pixel and a depth value from the geometry-rendered depth map corresponding to the pixel, and a confidence value from the confidence matrix corresponding to the pixel; and replacing the matching score of the pixel with the hint-modified value.

12. A non-transitory computer-readable storage medium storing instructions that, when executed by a computer processor, cause the computer processor to perform operations comprising:

receiving a time series of frames of a scene including a target frame, wherein the time series of frames is captured as monocular video data by a camera assembly;

applying a depth estimation model to the time series of frames including the target frame to output a depth map corresponding to the target frame, wherein applying the depth estimation model comprises:

generating a feature map for each frame in the time series of frames by applying a feature encoder of the depth estimation model to the frame to extract visual features forming the feature map, matching features across the feature maps of the time series of frames forming a cost volume, obtaining a geometry-rendered depth map from a geometry model of the scene based on a pose of the target frame in the scene, modifying the cost volume based on the geometry-rendered depth map, and generating the depth map for the target frame by applying a depth decoder of the depth estimation model to the modified cost volume; and generating virtual content using the depth map; and displaying the target frame of the scene augmented with the virtual content.

13. The non-transitory computer-readable storage medium of claim 12, wherein matching the features across the feature maps comprises:

warping the feature maps from other frames in the time series of frames onto the feature map of the target frame at a plurality of hypothesis depth planes; and determining a distance between the warped feature maps and the feature map of the target frame, the distances at each of the plurality of hypothesis depth planes forming the cost volume.

14. The non-transitory computer-readable storage medium of claim 12, wherein matching features across the feature maps comprises applying a matching neural network to features across the feature maps to generate a matching score for a pixel of the cost volume.

15. The non-transitory computer-readable storage medium of claim 12, the operations further comprising:

generating the geometry model of the scene through volumetric scene construction from historical depth maps of the scene.

16. The non-transitory computer-readable storage medium of claim 15, wherein generating the geometry model comprises applying a truncated signed distance function to integrate the historical depth maps from corresponding poses.

17. The non-transitory computer-readable storage medium of claim 16, the operations further comprising:

updating the geometry model of the scene with the depth map output by the depth estimation model for the target frame.

18. The non-transitory computer-readable storage medium of claim 12, the operations further comprising:

obtaining the geometry model from an online system, wherein the geometry model of the scene is generated through volumetric scene construction from historical depth maps of the scene captured from a plurality of client devices.

19. The non-transitory computer-readable storage medium of claim 12, wherein applying the depth estimation model further comprises:

obtaining a confidence matrix associated with the geometry-rendered depth map, wherein modifying the cost volume is further based on the confidence matrix.

20. The non-transitory computer-readable storage medium of claim 19, wherein modifying the cost volume comprises, per pixel of the cost volume:

determining a hint-modified value by applying a hint neural network to a matching score of the pixel, a difference between a depth of a depth plane of the pixel and a depth value from the geometry-rendered depth map corresponding to the pixel, and a confidence value from the confidence matrix corresponding to the pixel; and replacing the matching score of the pixel with the hint-modified value.

* * * * *